(12) United States Patent
Burg et al.

(10) Patent No.: US 6,695,606 B1
(45) Date of Patent: Feb. 24, 2004

(54) EXTRUDATE SHRINKAGE CONTROL AND REDUCTION

(75) Inventors: Gary Robert Burg, Canton, OH (US); Steven John Deren, Napanee (CA); Richard David Vargo, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/601,098

(22) PCT Filed: Jan. 29, 1998

(86) PCT No.: PCT/US98/01701

§ 371 (c)(1),
(2), (4) Date: Jul. 25, 2000

(87) PCT Pub. No.: WO99/38664

PCT Pub. Date: Aug. 5, 1999

(51) Int. Cl.⁷ ............................................. B29C 47/12
(52) U.S. Cl. .................. 425/133.5; 425/131.1; 425/464; 425/465; 425/224; 264/210.1; 264/177.1
(58) Field of Search ............................ 264/171.25, 129, 264/176.1, 175, 177.1, 173.11, 173.12, 177.16, 173.15, 173.16, 173.18, 210.1; 425/133.5, 224, 327, 374, 462, 376.1, 461, 464, 194, DIG. 235, 131.1, 465

(56) References Cited

U.S. PATENT DOCUMENTS

| | | | | |
|---|---|---|---|---|
| 2,212,770 A | * | 8/1940 | Foster ........................ 264/216 |
| 2,892,212 A | * | 6/1959 | Rhodes ........................ 425/327 |
| 3,994,654 A | * | 11/1976 | Chyu ........................ 264/176.1 |
| 4,017,240 A | * | 4/1977 | Nelson ........................ 137/561 A |
| 4,526,528 A | | 7/1985 | Kline et al. ............... 425/133.5 |
| 4,539,169 A | | 9/1985 | Nixon et al. ................. 264/171 |
| 4,653,994 A | * | 3/1987 | Capelle .................... 425/131.1 |
| 4,683,095 A | * | 7/1987 | Tolonen et al. ......... 264/173.12 |
| 4,719,071 A | | 1/1988 | Capelle ..................... 264/40.2 |
| 4,963,309 A | | 10/1990 | Gohlisch et al. ............ 264/175 |
| 5,017,118 A | | 5/1991 | Looman et al. .......... 425/133.5 |
| 5,122,049 A | * | 6/1992 | Baumgarten ................ 264/175 |
| 5,814,258 A | * | 9/1998 | Ogawa et al. ......... 264/173.12 |
| 5,928,679 A | * | 7/1999 | Ohki et al. ............... 264/173.1 |

FOREIGN PATENT DOCUMENTS

| | | | | |
|---|---|---|---|---|
| EP | 730939 A2 | 9/1996 | ........... B29C/47/00 |
| EP | 753391 A1 | 1/1997 | ........... B29C/47/06 |

* cited by examiner

*Primary Examiner*—Michael Colaianni
*Assistant Examiner*—Monica Fontaine
(74) *Attorney, Agent, or Firm*—Brouse McDowell; Roger D. Emerson (57) ABSTRACT

An extrusion apparatus for extruding visco-elastic materials includes an extruder head for preliminary shaping of a visco-elastic melt and a splice bar die assembly for final shaping of the visco-elastic melt. Both the extruder head and the die assembly have flow channels that include low elongational flow zones where elongational flow is reduced and controlled, thereby reducing and controlling the resulting shrinkage of the extrudate. Extrudate shrinkage can also be reduced and controlled by controlling the die swell of the visco-elastic melt by rotating the roller at a selected roller speed less than the melt speed.

8 Claims, 12 Drawing Sheets

EXTRUDATE SHRINKAGE CONTROL AND REDUCTION

TECHNICAL FIELD

This invention pertains to the art of methods and apparatuses for use with the extrusion of visco-elastic materials, and more specifically to the art of methods and apparatuses for the control and reduction of extrudate shrinkage.

BACKGROUND ART

It is well known in the art to extrude visco-elastic materials such as rubber, plastics and food products using one or more extruders individually or in combination. Visco-elastic materials possess both viscous (liquid-like) and elastic (solid-like) characteristics. During processing, visco-elastic materials flow (like liquids), but they also experience stretching (like elastic solids). This stretching of the visco-elastic material while it flows is called elongational flow. A flow channel is provided for communicating the visco-elastic material from the extruder to a die. Typically, the flow channel is provided within an extruder head. It is also common to add additional flow channels in die assemblies which may have splice bars, inserts, preformers and the like to communicate the visco-elastic material from the extruder head to the die. A die plate provides the final cross-sectional contour of the extrudate. When a roller is used with a die assembly to form the final cross-sectional shape, the extrusion apparatus is referred to as a roller die extrusion apparatus. Examples of roller die extrusion apparatus are shown and described in U.S. Pat. Nos. 4,526,528 and 4,539,169. Visco-elastic materials undergoing the extrusion process are referred to as "melt" while the same materials after the extrusion process are referred to as "extrudate".

Conventional methodology, known in the rubber industry, uses flow channels with continually decreasing cross sectional areas, i.e., "funnel" like cross sections. This is done to maintain the melt in compression and to prevent "dead spots" and any resulting porosity in the extrudate. Typically in the tire industry, the flow channels in the extruder head are designed to the maximum width (or sum of the tire components widths) and to the maximum thickness of the tire components to be extruded. This results in die assembly flow channels that begin with a very wide, thick cross sectional area and end with a very small, thin cross sectional area. All such "funnel-like" flow channels lead to increased elongational flow as will be discussed further below.

One problem known in the art, for example in the rubber industry, is referred to as die swell. Die swell is the difference between the dimensions of the cross section of an extrudate and the corresponding dimensions of the die orifice by which the extrudate is formed. This definition is found in ASTM D1566-93a, "Standard Terminology Relating to Rubber." Typically, die swell is undesirable as it leads to extrudate that has different dimensions from the "as extruded" or "on spec" dimensions.

Another problem know in the art is shrinkage. Shrinkage is the tendency of the extrudate to become shorter in the process direction as a function of time and temperature. The more the melt is stretched during the extrusions process, i.e., the greater the elongational flow, the more the extrudate will tend to shrink after exiting the die. This tendency of visco-elastic material to revert after processing to the state prior to processing is referred to as "memory." It is as if after the extrusion process the visco-elastic material "remembers" its molecular state before the extrusion process and tries to return to it. Thus, the extrudate shrinks. Shrinkage is undesirable because it leads to extrudate that is shorter and/or of less thickness than the "as extruded" or "on spec" dimensions. In the tire industry, shrinkage can result in open component splices on green tire constructions and in cured tires. This occurs because the tire component shrinks, i.e., gets shorter in overall length, leading to a tire component that does not go all the way around the tire so that a proper splice can be made or maintained.

Still another problem with shrinkage, known in the tire industry, occurs when tire components are formed from different rubber compounds which have been co-extruded. Each compound is initially processed through a separate extruder but then all the compounds, as melts, are brought together, typically using a common extruder head or die assembly of some kind, so that they can be extruded together with each compound properly placed with respect to the other compounds. The problem is related to the fact that the amount of shrinkage of each tire compound depends on the rubber composition and the size of the extruder used to make it. In other words, each rubber compound has a unique shrinkage and rate of shrinkage (depending on the extruder used and die assembly). For example, if a tire component made of a higher shrinkage rubber compound, e.g., white sidewall, is co-extruded with a tire component made of a lower shrinkage rubber compound, e.g., black sidewall, then the resulting extrudate, after being cut and given sufficient time, may buckle or curl (depending on the geometry of the components). This would occur because the white sidewall compound would shrink more than the black sidewall compound. The resulting tire would be a reject because during the curing of the tire, the black sidewall compound would fill any gap created by the higher shrinkage white sidewall compound producing a tire with a discontinuous white sidewall.

The present invention provides methods and apparatuses for reducing and/or controlling the problems mentioned above. Thus, the difficulties inherent in the prior art are overcome in a way that is simple and efficient while providing better and more advantageous results.

DISCLOSURE OF INVENTION

In accordance with one aspect of the invention there is provided an extruder head having a head flow channel for communicating and shaping a visco-elastic melt. The head flow channel has a low elongational flow zone at least 1.0 inch long at the end of the head flow channel.

In accordance with another aspect of the invention, the low elongational flow zone has a varying cross sectional shape and a length ratio within the range of 0.10 to 0.50. The length ratio is the ratio of the length of the low elongational flow zone to the length of the head flow channel.

In accordance with still another aspect of the invention there is provided a die assembly having a flow channel for communicating and shaping a visco-elastic melt. The flow channel has a low elongational flow zone at least 1.0 inch long.

In accordance with another aspect of the invention, the low elongational flow zone has a length divided by area (L/A) ratio of at least 2.0. The length divided by area (L/A) ratio is the ratio of the length of the low elongational flow zone to the cross sectional area of the low elongational flow zone.

In accordance with another aspect of the invention, the flow channel of the die assembly has a flow channel area ratio of the cross sectional area of the flow channel at its entrance to the cross sectional area of the flow channel at its exit from the die within the range of 1.0 to 3.0.

In accordance with still another aspect of the invention there is provided a method of reducing the shrinkage of a visco-elastic extrudate formed from a visco-elastic melt wherein the visco-elastic melt flows through an extruder head having a head flow channel with a low elongational flow zone and then flows through a die assembly having a first flow channel with a low elongational flow zone.

In accordance with another aspect of the invention there is provided a method of controlling the die swell of a visco-elastic melt wherein the visco-elastic melt flows through a flow channel in a die assembly at a melt speed V1. The visco-elastic melt then flows onto a roller rotating at a roller speed V2 which is less than the melt speed V1. The melt speed V1 and the roller speed V2 define a speed ratio of V1/V2 which is at least 1.1.

One advantage of the present invention is that elongation flow of a visco-elastic melt is reduced thereby reducing the shrinkage of the resulting extrudate.

Another advantage of the present invention is that the shrinkage differential between different rubber compounds is reduced.

Still another advantage of the present invention is that die swell is controlled and thereby shrinkage of the extrudate is reduced.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
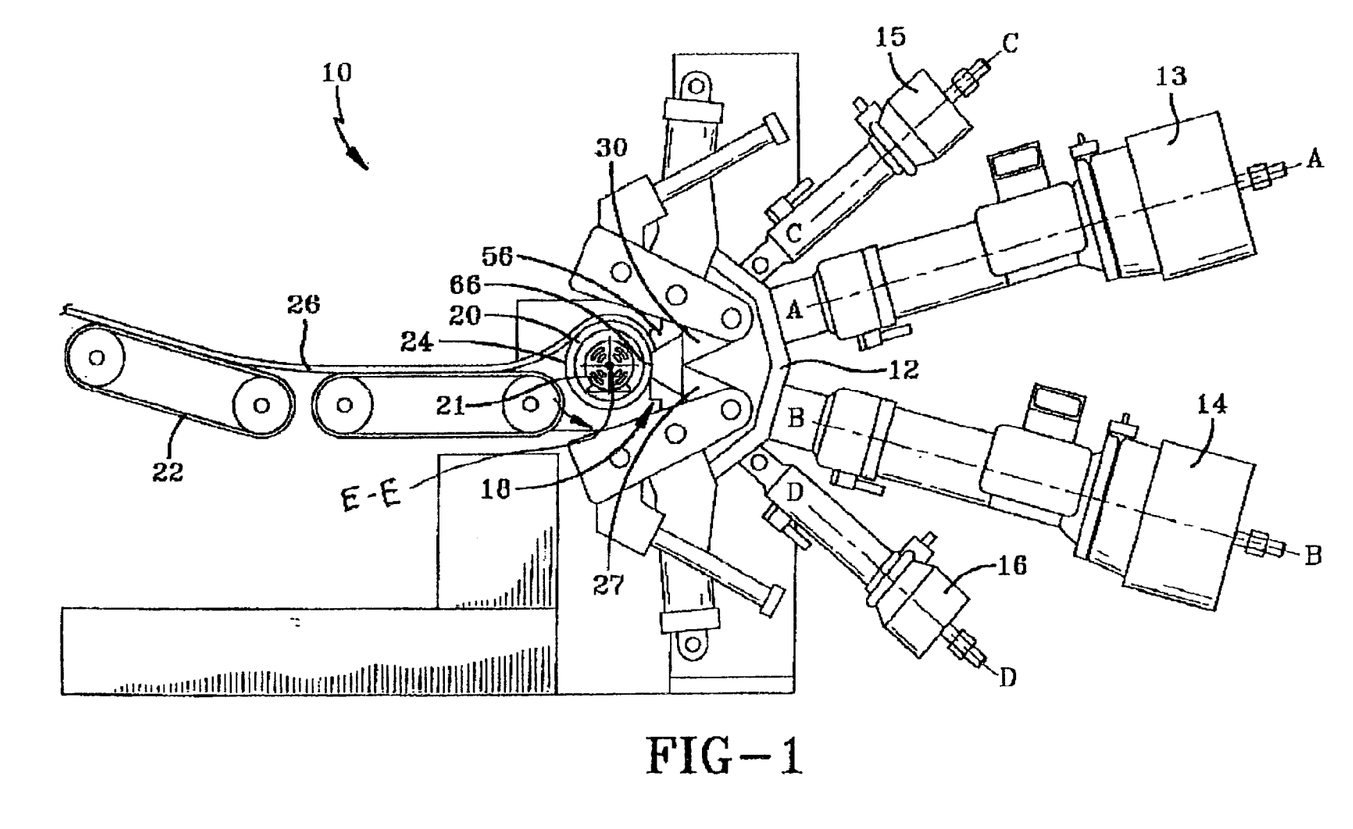
FIG. 1 is a side elevation of the extrusion apparatus of the present invention showing first, second, third and fourth extruders, the roller, and the extrudate takeaway conveyor.

Referring now to the drawings wherein the showings are for purposes of illustrating a preferred embodiment of the invention only and not for purposes of limiting the same, FIG. 1 shows an extrusion apparatus 10 which is used to extrude visco-elastic materials (not shown) to form a strip of extrudate 26 such as a tire sidewall. The extrusion apparatus 10 includes an extruder head 12 having first and second cavity blocks 27, 30 that are connected to a first pressure means such as a first extruder 13 and a second pressure means such as a second extruder 14 which may be positioned underneath the first extruder, a third pressure means such as a third extruder 15 and a fourth pressure means such as a fourth extruder 16. The first extruder 13 is of a type having a screw rotatable about an axis A—A and the second extruder 16 is of a similar type having a screw rotatable about an axis B—B. As shown in FIG. 1, the first extruder 13 and the second extruder 14 may be positioned with the axes A—A and B—B at an acute angle to facilitate the feeding of the visco-elastic material melt (not shown) from both extruders into the extruder head 12. The third extruder 15 and the fourth extruder 16 are also of a similar type and have screws rotatable about axes D—D and C—C respectively for feeding visco-elastic material (not shown) into the extruder head 12.

Figure 2:
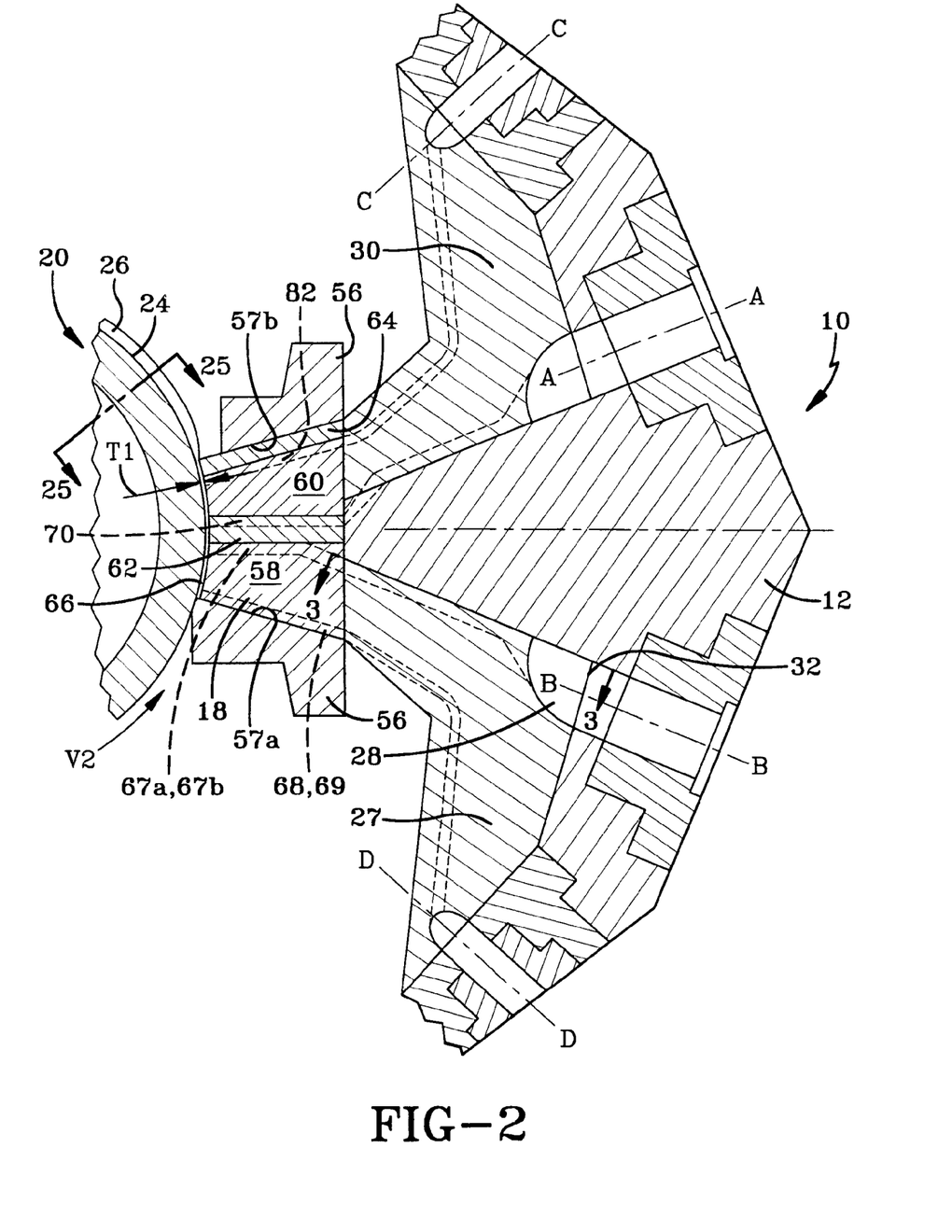
FIG. 2 is a schematic fragmentary sectional side elevation of part of the extrusion apparatus showing how the first and second cavity blocks of the extruder head are matched with the die assembly.

With reference to FIGS. 1 and 2, the extrusion apparatus 10 also includes a die assembly 18 that is operatively associated with a roller 20. The roller 20 is mounted for rotation about an axis C—C and has a surface 24 that is generally cylindrical. A motor 21 may be provided for driving the roller 20 at a desired speed. The roller 20 is selectively slidable toward and away from the die assembly 18 via means currently known in the art. In this embodiment, the die assembly 18 and roller 20 combine to shape the extrudate 26 which is moved away from the roller 20 by a take-a-way belt 22. In an alternative embodiment (not shown) a roller is not used, i.e., the die assembly shapes the extrudate without a roller. The shaping of the extrudate 26 will be discussed in more detail below.

Figure 3:
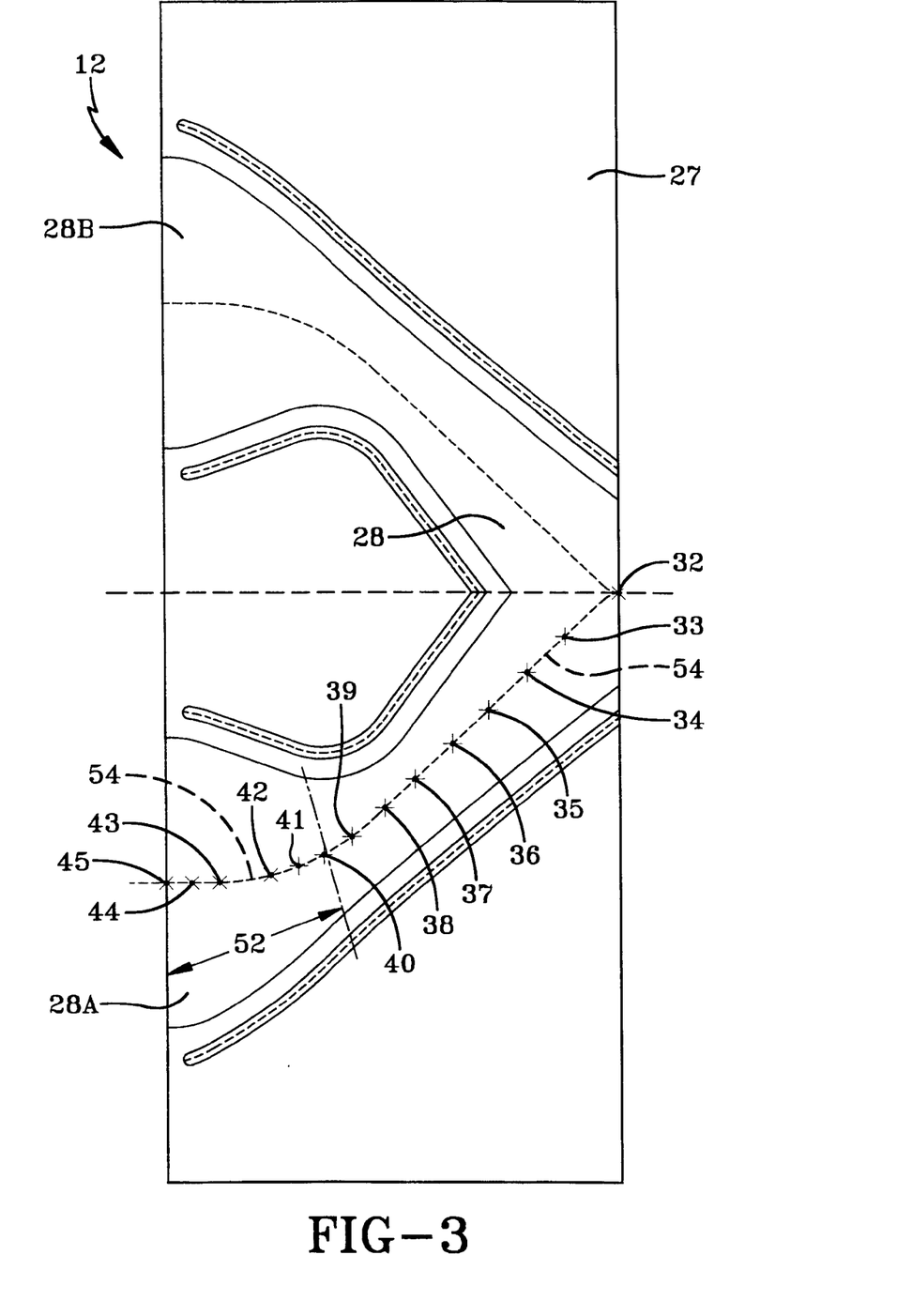
FIG. 3 is a top view of the first cavity block extruder head taken along the plane of line 3—3 in FIG. 2 showing the first head flow channel branching into first and second branch flow channels having low elongational flow zones.

With reference now to FIGS. 1–3, the extruder head 12 has a first cavity block 27 with a first head flow channel 28 for communicating a first melt such as black sidewall rubber (not shown) from the second extruder 14 to the die assembly 18. The extruder head 12 also has a second cavity block 30 with a second head flow channel (not shown) for communicating a second melt such as white sidewall rubber (referenced as 17 in FIG. 23) from the first extruder 13 to the die assembly 18. The first melt experiences preliminary shaping in the first head flow channel 28a and the second head flow channel 28b in preparation for final shaping in the die assembly 18. The first head flow channel 28 of this embodiment, as shown in FIG. 3, branches into the first and second branch flow channels 28a, 28b which preferably have similar cross sectional areas throughout their respective lengths. The fourth melt such as chafers communicated from the fourth extruder 16 is shaped by flow channels similar to channels 28, 28a and 28b in second cavity block 30. The third melt such as a cover for the white sidewall communicated from the third extruder 15 flows through a flow channel to the extruder head 12.

Before discussing the extrusion apparatus 10 further, a brief discussion of some important concepts will be presented. First it should be noted that melts flowing through a flow channel having a constant cross sectional area do not experience significant elongational flow. Melts flowing through a narrowing, funnel like flow channel, however, experience significant elongational flow and resulting shrinkage in the extrudate occurs. It is believed by the applicants that during elongational flow the molecules of the melt are perturbed from their desired resting state. The elastic response of these molecules is to return to their original state. This is believed to be partially the origin of the shrinkage response.

Secondly, it should be noted that if a melt is moved through a flow channel having a constant cross sectional area for some significant portion of the flow channel's length, the viscous nature of the melt will contribute to a relaxation of the molecules. The applicants believe that internally the molecules of the melt are flowing past one another (as it is a viscous melt) disentangling and relieving some of the internal stress. This flow and relaxation of the molecules past one another will result in less overall component shrinkage. Time is an important factor since the longer the melt is held within a given cross sectional area, the greater is the amount of resulting relaxation; leading to reduced shrinkage. Temperature is also an important factor as the higher the temperature, the faster the resulting relaxation and flow of the molecules, leading again to reduced shrinkage.

Third, it should be noted that applicants believe that die swell provides some reduction in shrinkage by relaxing the molecules of the melt. That is, there is a correlation between the die swell of the melt and the final shrinkage of the extrudate. These concepts will be discussed further below.

Figure 4:
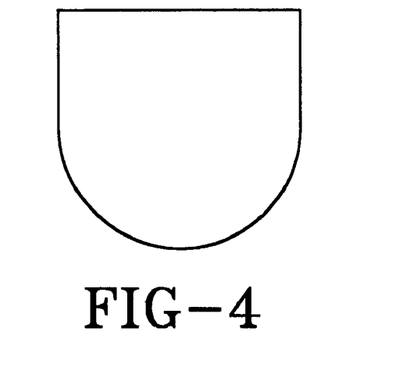
FIG. 4 is a schematic sectional view taken along the centerline of the head flow channel of the extruder head 12 at the entrance location 32 shown in FIG. 3 illustrating the shape of the cross sectional area of the channel at that location.
Figure 5:
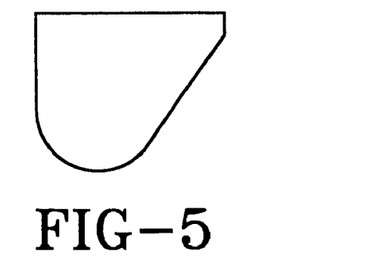
FIG. 5 is a view like FIG. 4 at the location 33 as shown in FIG. 3.
Figure 6:
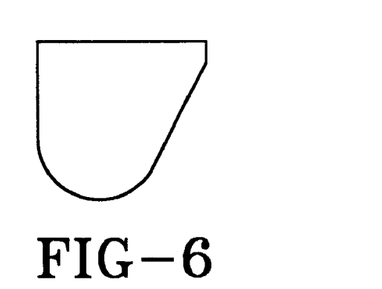
FIGS. 6 through 11 are views like FIG. 4 at locations 34 through 39 as shown in FIG. 3.
Figure 7:
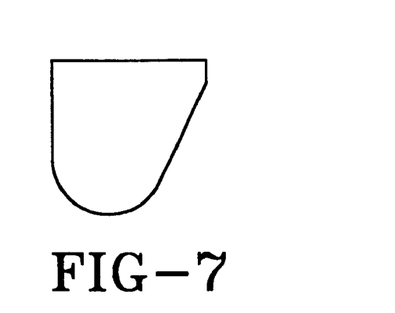
Figure 8:
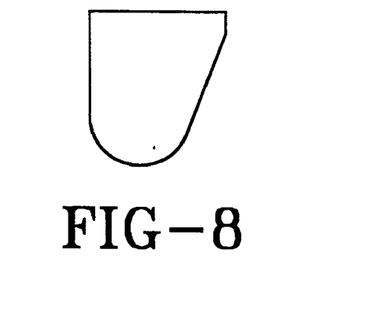
Figure 9:
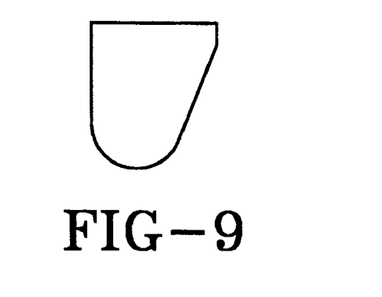
Figure 10:
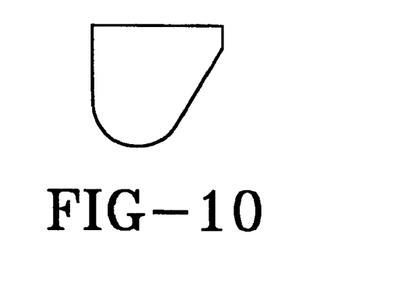
Figure 11:
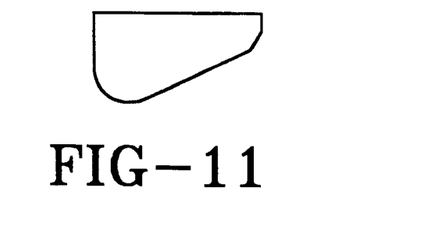
Figure 12:
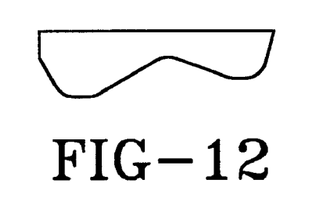
FIG. 12 is a schematic sectional view along the centerline of the head flow channel of the extruder head at the location 40 shown in FIG. 3 illustrating the shape of the cross sectional area at the beginning of the low elongational flow zone.
Figure 13:
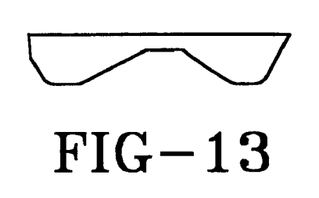
FIGS. 13 through 16 are views like FIG. 12 at the locations 41 through 44 as shown in FIG. 3.
Figure 14:
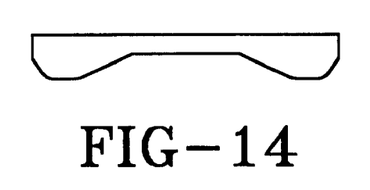
Figure 15:
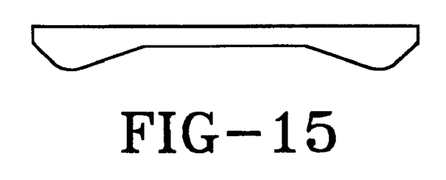
Figure 16:
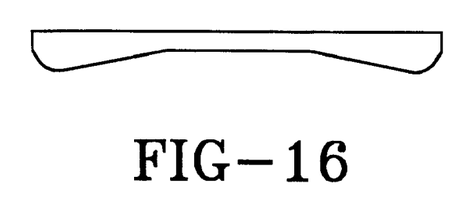
Figure 17:
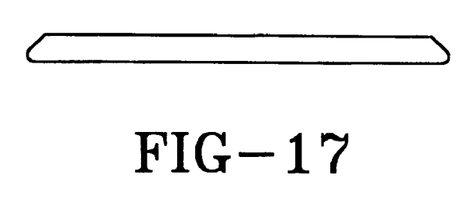
FIG. 17 is a schematic sectional view along the centerline of the head flow channel of the extruder head at the exit location 45 shown in FIG. 3 illustrating the shape of the cross sectional area at that location.

Referring now to FIGS. 3–17, the first branch flow channel 28a of the first cavity block 27 has a center line 54 that is used herein to reference various locations as follows. The second melt such as black sidewall rubber flows into the extruder head 12 at entrance location 32 and flows out of the extruder head 12 at exit location 45. In between the entrance location 32 and the exit location 45, the cross sectional area of the first branch flow channel 28a, and thus the cross sectional area of the second melt as it passes therethrough, is gradually changed. The shape of the cross sectional area of the entrance location 32 is shown in FIG. 4 and the shape of the cross sectional area of the exit location 45 is shown in FIG. 17. The shapes of the cross sectional areas of the first branch flow channel 28a at locations 33–44, as referenced in FIG. 3, are shown in FIGS. 5–16 respectively. Thus, for example, the shape of the cross sectional area of the first branch flow channel 28a at location 38 is shown in FIG. 8.

Figure 18:
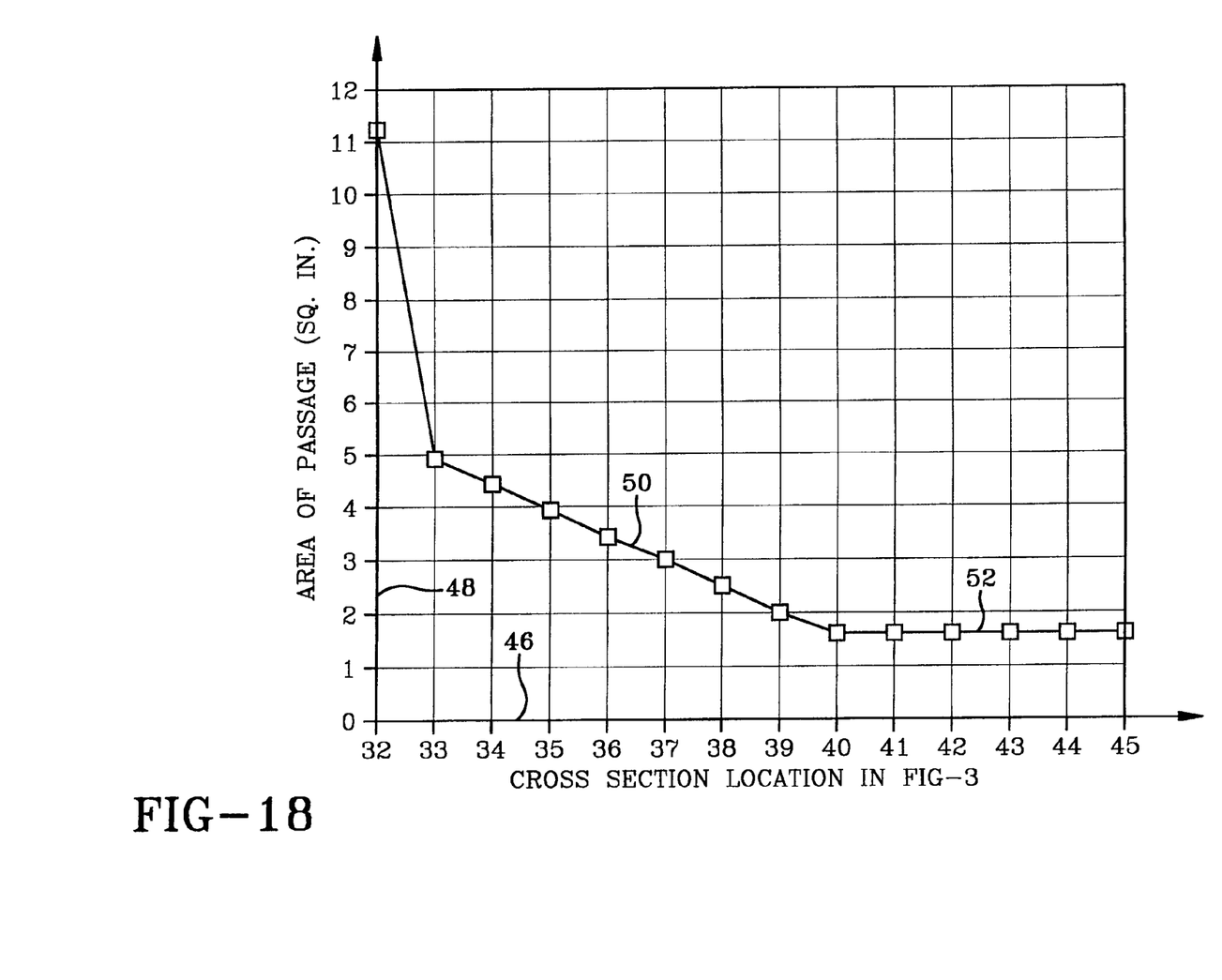
FIG. 18 is a graph showing the cross sectional areas of the locations along the centerline shown in FIG. 3 and illustrating the low elongational flow zone.

FIG. 18 shows a graph of the cross section locations and the cross sectional area at different locations along the flow channel 28a. The abscissa 46 represents the previously referred to locations 32–45 of the first branch flow channel 28a and the ordinate 48 represents the corresponding cross sectional area values in units of square inches. Thus, at the entrance location 32 the cross sectional area is about 11.2 square inches and at the exit location 45 the cross sectional area is about 1.6 square inches. The large drop off in cross sectional area between the entrance location 32 and the location 33, i.e., about 11.2 square inches to about 4.9 square inches, is due to the branching of the first head flow channel 28 into the first and second branch flow channels 28a, 28b, as seen in FIG. 3. In other words, the melt enters the extruder head 12 at the entrance location 32 but then is divided into two similar streams, one flowing through the first branch flow channel 28a and the second flowing through the second branch flow channel 28b. Thus, there is a location (not referenced) in the second branch flow channel 28b corresponding to the location 33 in the first branch flow channel 28a that has the same cross sectional area, i.e., about 4.9 square inches. The additional changes in cross sectional area between the location 33 and the exit location 45 of the first branch flow channel 28a, are similarly made in the second branch flow channel 28b.

With continuing reference to FIGS. 3 and 18, the first branch flow channel 28a has a substantial portion of its length, referred to as an outlet portion 52 with a low elongational flow zone, with the same cross sectional area. In this embodiment, the outlet portion 52 of the first branch flow channel 28a maintains a cross sectional area of about 1.6 square inches. The second branch flow channel 28b has a similar low elongational flow zone (not referenced). The outlet portion 52 is indicated in FIG. 18 which shows that the locations 40–45 all have the same cross sectional area of about 1.6 square inches. The outlet portion 52 is considered a low elongational flow zone because the melt in this zone does not experience substantial elongational flow. As a melt flows through an inlet portion 50 of the flow channel that is decreasing in cross sectional area, it is stretched, i.e., elongated. When a melt flows through the outlet flow channel 52 that remains constant in cross sectional area, it is not stretched. The outlet flow channel 52 with low elongational flow provides a portion of the flow channel where elongational flow of the melt is reduced and some stress relaxation of the melt can occur. In this way the shrinkage of extrudate 26 is reduced.

With reference now to FIGS. 3 and 12–18, it should be noted that a zone area ratio of the cross sectional area at the entrance location 32, 11.2 square inches in this embodiment, to the cross sectional area at the outlet portion 52, 1.6 square inches in this embodiment, can be calculated. In this embodiment, the outlet portion zone area ratio is 11.2 divided by 1.6 or, about 7. Preferably, to minimize shrinkage of the extrudate 26, the zone area ratio is within the range of 3 to 20. It should be noted that although the actual cross sectional area throughout the flow channel outlet 52 remains the same, 1.6 square inches in this embodiment, the cross sectional shape varies. This is best seen by noting the variation in shapes shown in FIGS. 11–16 which are the shapes of the cross sectional areas at the locations 40–45 respectively. Thus, the outlet portion 52 of the flow channel 28*a* of this embodiment has a varying cross sectional shape.

With reference to FIG. 3, the length of the first branch flow channel 28*a*, i.e., the distance from the entrance location 32 to the exit location 45 as measured along the center line 54, is about 10.7 inches (27.18 centimeters). The length of the outlet portion 52, i.e., the distance from the location 40 to the exit location 45 as measured along the center line 54, is about 2.9" (7.36 centimeters). To benefit from reducing elongational flow, regardless of the length of the flow channel, the outlet portion 52 having low elongational flow should be at least 1.0 inches (2.54 centimeters) long. Further, a length ratio that is the ratio of the length of the outlet portion 52 to the length of the flow channel 28*a* should be within the range of 0.10 to 0.50 but is preferably about 0.25. In the embodiment herein presented, the length ratio using the English System is 2.9 inches (7.36 centimeters) to 10.7 inches (27.17 centimeters), i.e., 2.9 divided by 10.7 which equals 0.27.

With reference now to FIGS. 1, 2, 19, 20, 21, 22 and 23, the die assembly 18 is held in operative association with the roller 20 and the extruder head 12 by die holders 56 having flat surfaces 57*a* and 57*b* as is known in the art. The die assembly 18 of this embodiment comprises first and second splice bars 58, 60, an insert bar 62 and a die plate 64. The die assembly 18 has a roller facing surface 66 that is generally cylindrical and conforms to the shape of surface 24 of the roller 20.

Figure 19:
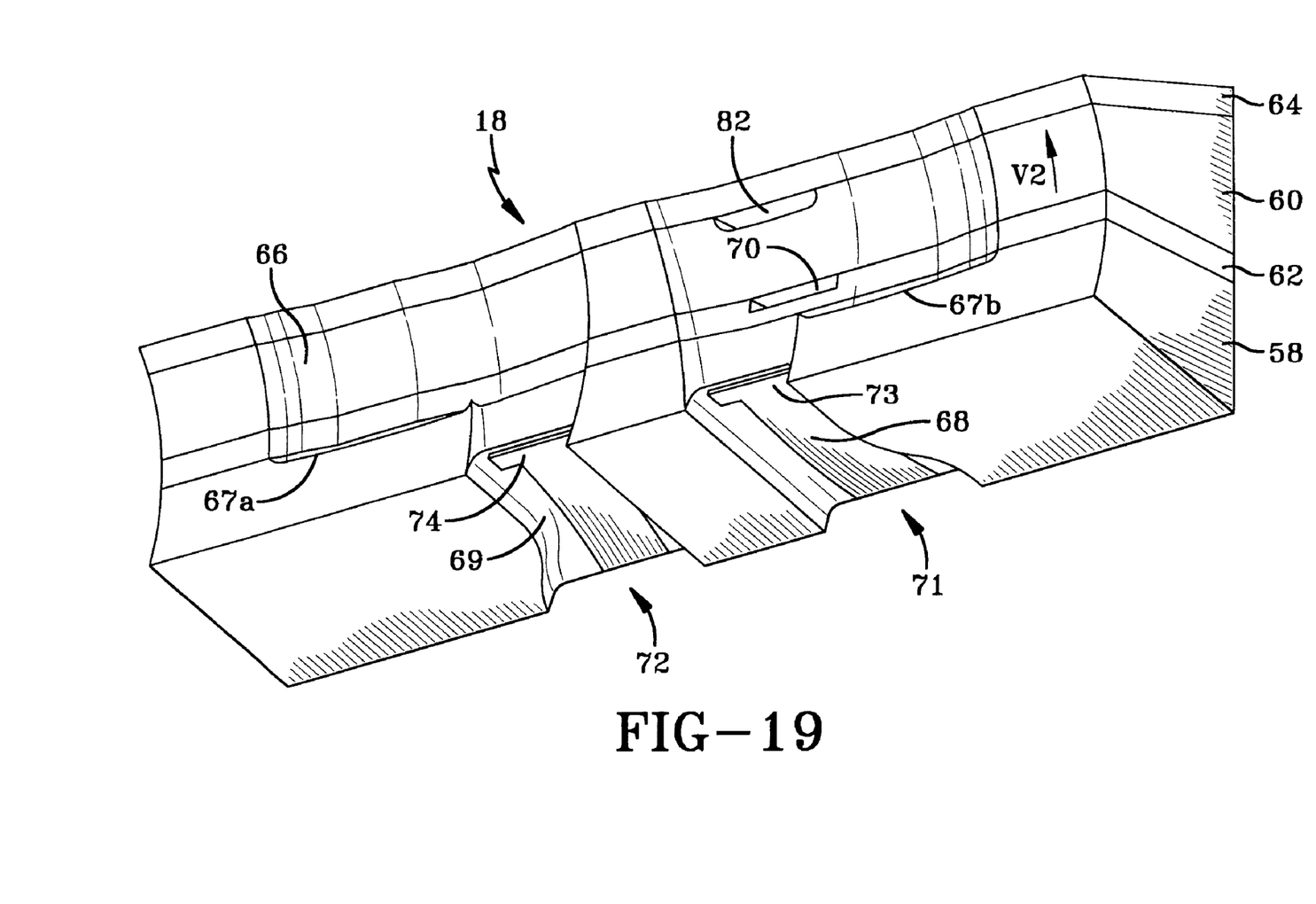
FIG. 19 is a perspective bottom view of the die assembly 18 showing the first and second flow channels of the first splice bar and the first flow channel of the insert bar.
Figure 20:
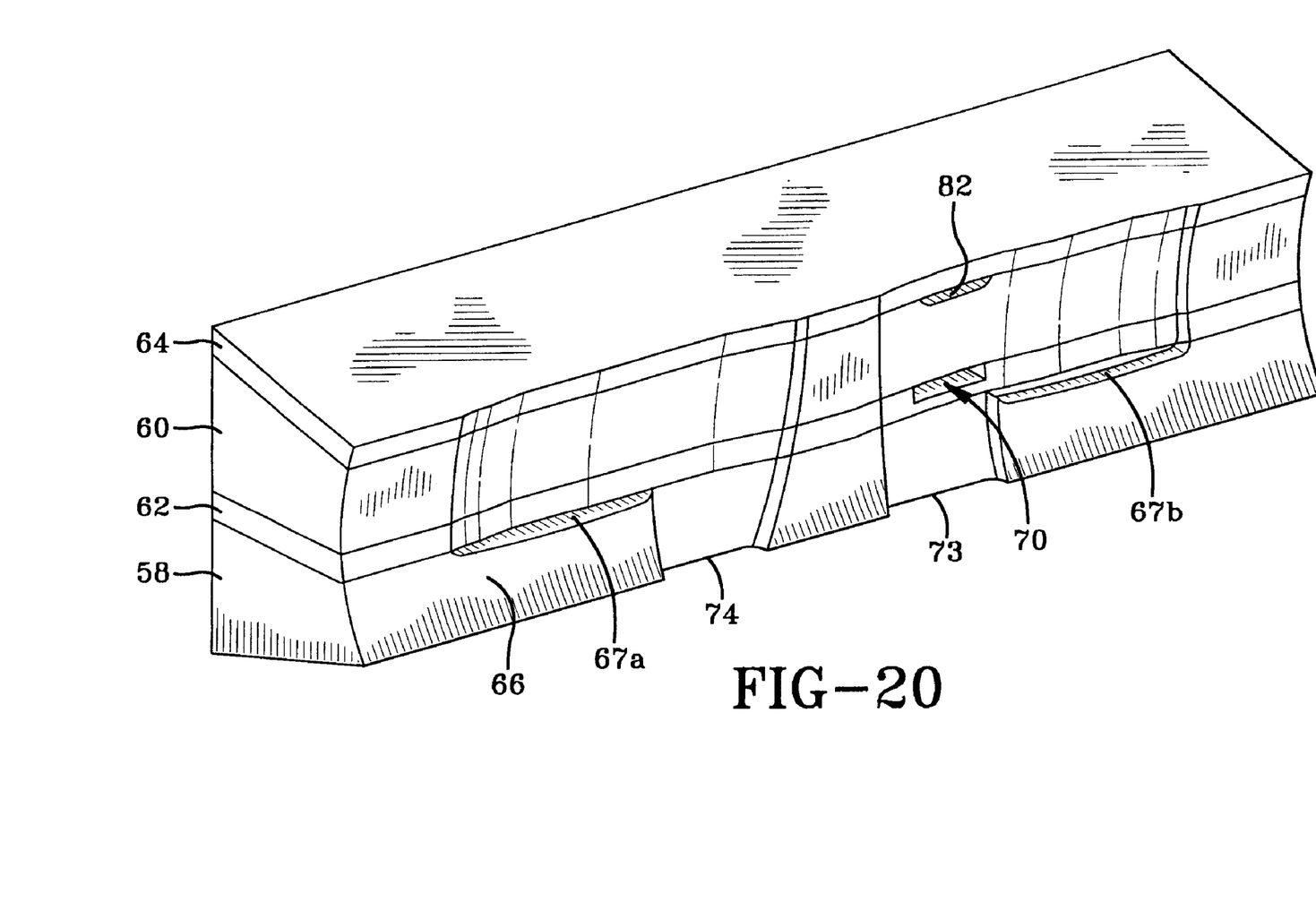
FIG. 20 is a perspective top view of the die assembly shown in FIG. 19 showing the roller facing surface and the die plate.
Figure 21:
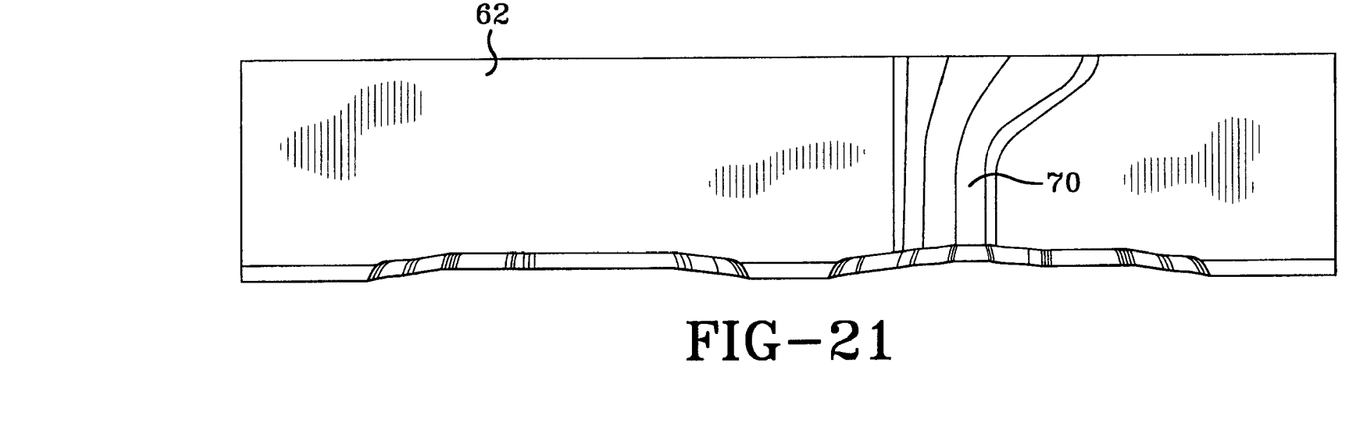
FIG. 21 is a top view of the insert bar of the die assembly of FIG. 19 showing the first flow channel therethrough.
Figure 22:
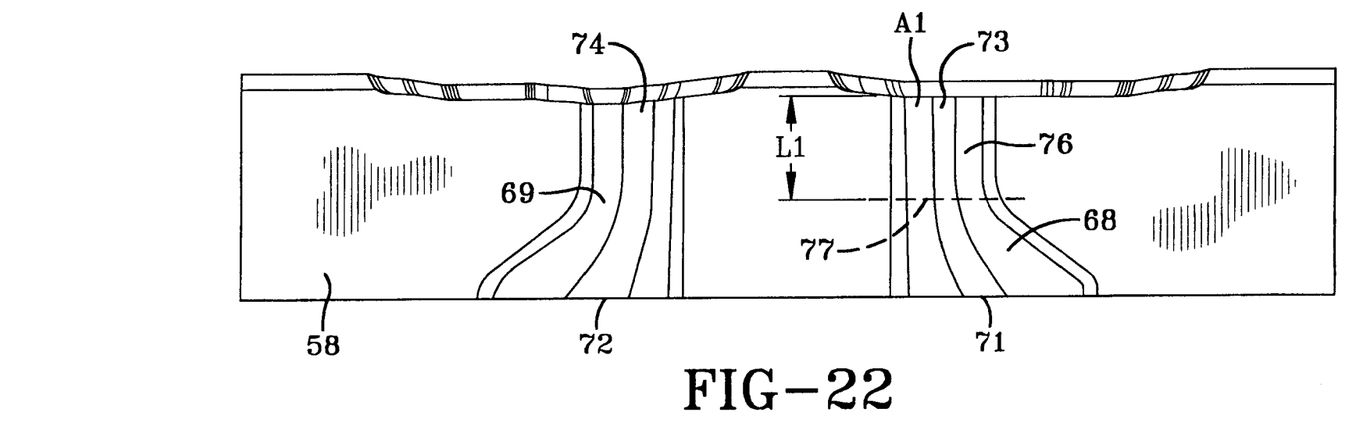
FIG. 22 is a bottom view of the first splice bar of the die assembly of FIG. 19 showing the first and second flow channels therethrough and the low elongational flow zone of the first and second flow channels.
Figure 23:
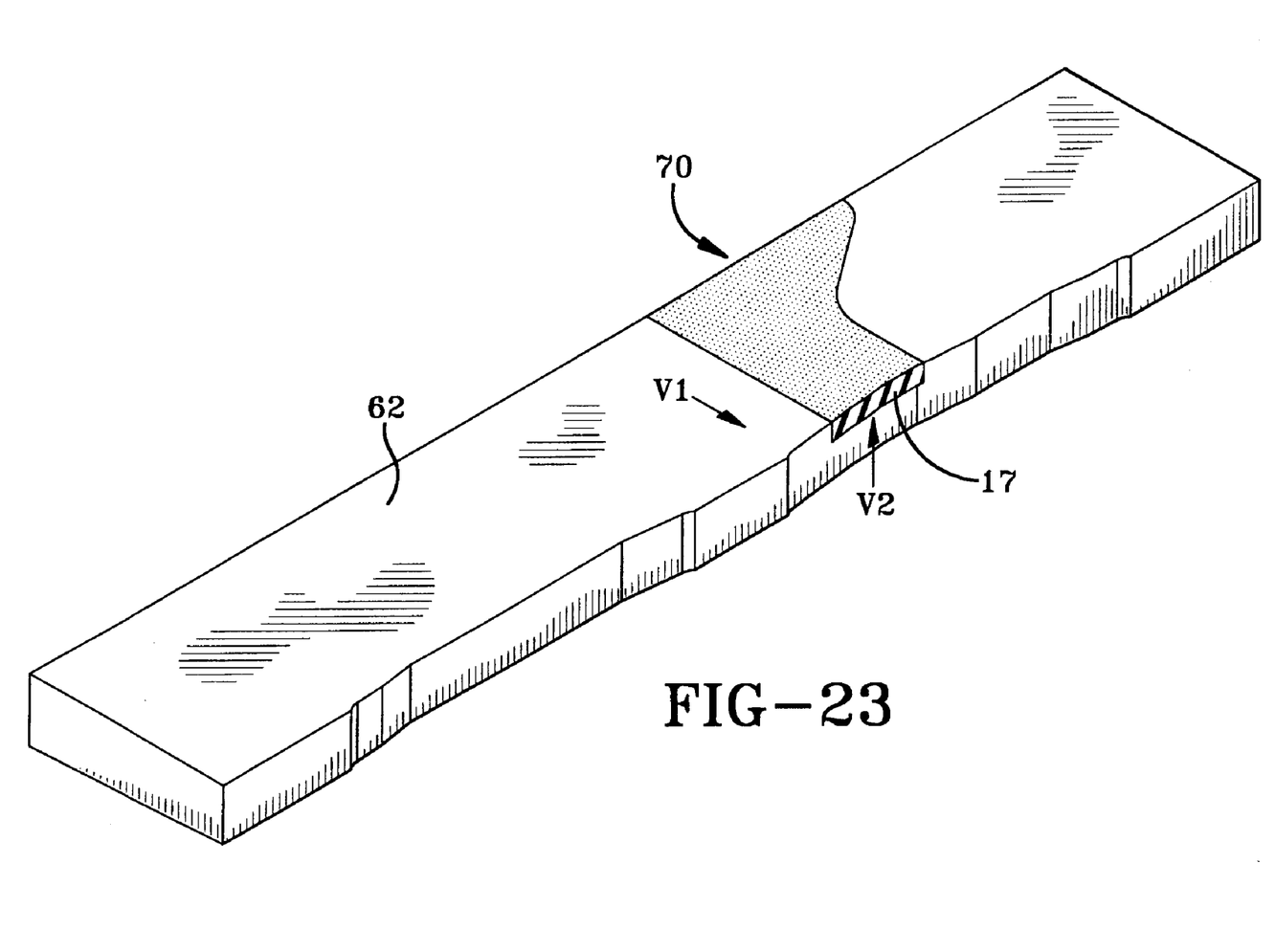
FIG. 23 is a perspective top view of the insert bar of the die assembly of FIG. 19 showing the melt flowing through the first flow channel.

With references now to FIGS. 1–3, 19–23 and 25, a first melt 83, which in this embodiment may be a chafer, is supplied by fourth extruder 16 which has passages in the extruder head 12 like channels 28, 28*a* and 28*b* shown in FIGS. 3–15 which are matched to the entrance ends 71 and 72 of flow channels 68 and 69 having exit ends 73 and 74 as shown in FIGS. 19, 20 and 22. A second melt 85, which in this embodiment may be a black sidewall, is supplied by second extruder 14 which has channels 28, 28*a* and 28*b* shown in FIGS. 3–15 which are matched to the entrance end of channels 67*a* and 67*b* in first splice bar 58. A third melt 17, which in this embodiment may be a white sidewall material, is supplied by the first extruder 13 which has a passage in the extruder head 12 which is matched by the flow channel 70 of the insert bar 62. As shown in FIG. 23, the flow channel 70 of the insert bar 62 has a thickness T1. A fourth melt 84, which in this embodiment is a cover strip, is supplied by a third extruder 15 which has a flow passage in the extruder head 12 which is matched by the flow channel 82 in second splice bar 60.

With reference to FIGS. 19–23, elongational flow is a function of a flow channel area ratio. The flow channel area ratio is the ratio of the cross sectional area at the entrance end of the flow channel to the cross sectional area at the exit end of the flow channel. The lower the flow channel area ratio, the lower the elongational flow of the melt and the lower the resulting shrinkage of the extrudate. For example, the flow channel area ratio of the first flow channel 68 of first splice bar 58 shown in FIG. 22 is the ratio of the cross sectional area at the entrance end 71 to the cross sectional area at the exit end 73. To minimize shrinkage of the extrudate chafer 26, the flow channel area ratio of the flow channels used in the die assembly 18, such as the first and second flow channels 68, 69 of the first splice bar 58 and the flow channel 70 of the insert bar 62, should be within the range of 1.0 to 3.0, but is preferably not greater than 2.0.

With continuing reference to FIGS. 19–23, elongational flow can also be reduced in the flow channels of the die assembly 18 as it was in the extruder head 12, i.e., by providing a low elongational flow zone where the melt can experience stress relaxation. As noted above, a low elongational flow zone is a zone along a substantial portion of the length of a flow channel, that is at least 1.0 inch (2.54 centimeters) long, where the cross sectional area remains constant. A length divided by area (L/A) ratio will now be discussed. It should be noted that the L/A ratio is only meaningful in the following discussion when both the length (L) and the area (A) are measured in corresponding units. By corresponding units it is meant that if, for example, L is expressed in inch units in accordance with the English system, then A must be expressed in units of inches squared. If, on the other hand, L is expressed in centimeters in accordance with the metric system, then A must be expressed in units of centimeters squared and the (L/A) ratio adjusted accordingly. As seen in FIG. 22, the first flow channel 68 of the first splice bar 58 has a low elongational flow zone or outlet portion 76 that extends from a location 77 along the axis of the first flow channel 68 to the exit end 73. The low elongational flow zone 76 has a length L1 and a cross sectional area A1 with a resulting L/A ratio of L1/A1. In the low elongational flow zone, the greater the L/A ratio, the lower the elongational flow. Thus, for outlet portion 76, elongational flow of the melt and resulting shrinkage of the extrudate 26 is reduced as the L/A ratio (L1/A1) is increased. To minimize shrinkage significantly, it is preferred that L/A be at least 2 wherein the units of measurement are in the English system.

The effect of the L/A ratio on shrinkage has been demonstrated in laboratory testing. In the laboratory, the flow channels used have a circular cross section so that the ratio used for testing is the length of the flow channel over the diameter of the flow channel (hereinafter referred to as the L/D ratio). As is commonly known in the art, the relationship between a circle's cross sectional area and its diameter is expressed in the equation, $A=(\pi \times D \times D)/4$ where A represents the area of the circle and D represents its diameter. Since the area of a circle is directly proportional to its diameter, testing done using the L/D ratio is directly proportional to the L/A ratio.

Figure 24:
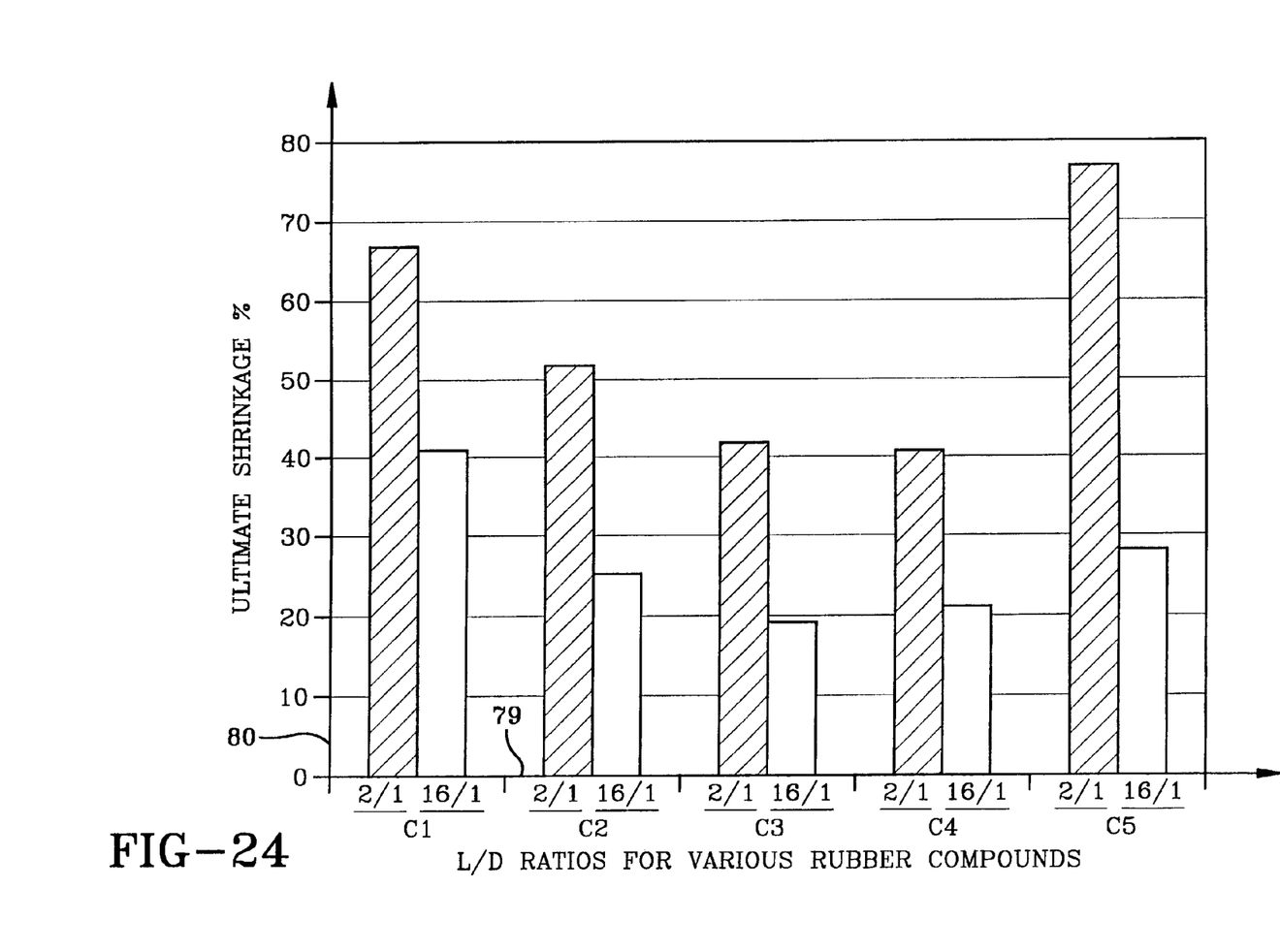
FIG. 24 is a chart showing laboratory results of how ultimate shrinkage is reduced as the ratio of length and diameter (L/D) of a flow channel is increased.

FIG. 24 shows laboratory results illustrating how shrinkage is decreased when the L/D ratio is increased. The abscissa 79 represents five rubber compounds, referred to as C1–C5, that were extruded through the laboratory flow channel. The particular chemical compositions of these rubber compounds are trade secrets and are immaterial to this invention. The ordinate 80 represents ultimate shrinkage as a percentage. The ultimate shrinkage is all the shrinkage that will occur if an extrudate is allowed to shrink as much as it ever will. The cross hatched bars represent the amount of ultimate shrinkage when the L/D ratio is 2/1 or 2 and the other bars represent the amount of ultimate shrinkage when the L/D ratio is 16/1 or 16. For example, when rubber compound C1 was extruded through a flow channel having an L/D ratio of 2, the ultimate shrinkage was about 67%. When the same rubber compound C1 was extruded through a flow channel having an L/D ratio of 16, the ultimate shrinkage was about 41%. Thus, the ultimate shrinkage of rubber compound C1 is reduced about 26% (67%–41%) when it is extruded through a flow channel having 8 times (16/2) the L/D ratio. It should also be noted that increasing the L/D ratio also reduces the shrinkage differential between rubber compounds. With an L/D ratio of 2, for example, rubber compound C4 has an ultimate shrinkage of 41% and rubber compound C5 has an ultimate shrinkage of 77%. Thus, a shrinkage differential of 36% (77%–41%) exists between the two rubber compounds when the L/D ratio is 2. With an L/D ratio of 16, however, rubber compound C4 has an ultimate shrinkage of 21% and rubber compound C5 has an ultimate shrinkage of 28%. Thus, when the L/D ratio is 16, a shrinkage differential of only 7% (28%–21%) exists between the same two rubber compounds.

With reference now to FIGS. 1, 2 and 19–23, as noted above, controlling die swell can be used to reduce the final shrinkage of the extrudate 26. In a roller die extrusion apparatus, such as extrusion apparatus 10, the melt, such as third melt 17, which in this application is a white sidewall rubber, can be allowed to experience a controlled amount of die swell before it contacts the roller 20. FIG. 23 shows the insert bar 62 with the second melt 17 flowing through the flow channel 70 in the insert bar 62 at a melt speed V1. FIG. 2 shows the roller 20 rotating to provide a roller surface speed of V2. Typically, the melt speed V1 is the same as the roller speed V2. The problem is that when the melt sped V1 equals the roller speed V2, the molecules of the melt are laid on the roller 20 in the same state of strain that they had in the die assembly 18. The melt can be relaxed by providing a time interval for the melt to experience die swell as it is laid on the roller 20. This is made possible when the melt speed V1 is greater than the roller speed V2. In other words, a speed ratio, V1/V2, should be greater than 1.0. Preferably, the speed ratio is at least 1.1. To maintain the same mass output of melt, the cross sectional area of the flow channel must be correspondingly reduced as compared to when the melt speed V1 and the roller speed V2 are the same. To reduce the cross sectional area of the flow channel 70 it is preferred that the thickness T1 be reduced accordingly.

With reference now to FIGS. 1–3, 19, 20 and 23, the extrusion apparatus 10 of this invention is utilized as follows. Visco-elastic materials (not shown) are fed into the first, second, third and fourth extruders 13, 14, 15 and 16 where the materials are melted into third, second, fourth and first melts respectively and flow into the extruder head 12. The first melt 83 which may be a pair of chafers of visco-elastic rubber material is extruded from the fourth extruder 16 into the extruder head 12 and then flows through the flow channels 68 and 69 and through exit end 73 and exit end 74 of the flow channels onto the surface 24 of the rotating roller 20. The second melt 85 which may be visco-elastic black sidewall rubber material is extruded from the second extruder 14 into channels 67a and 67b in first splice bar 58 and then onto the surface 24 of the rotating roller 20 or over the chafers of the first melt 83. A third melt 17, which may be a visco-elastic white sidewall rubber material is extruded from the first extruder 13 into channel 70 of insert bar 62 and then onto the surface 24 of the rotary roller 20 or over the black sidewall material of second melt 85. The fourth melt 84, which may be a visco-elastic cover rubber material is extruded from the third extruder 15 into flow channel 82 and then onto the surface 24 of the roller 20 or over the white sidewall material of first melt 17.

Figure 25:
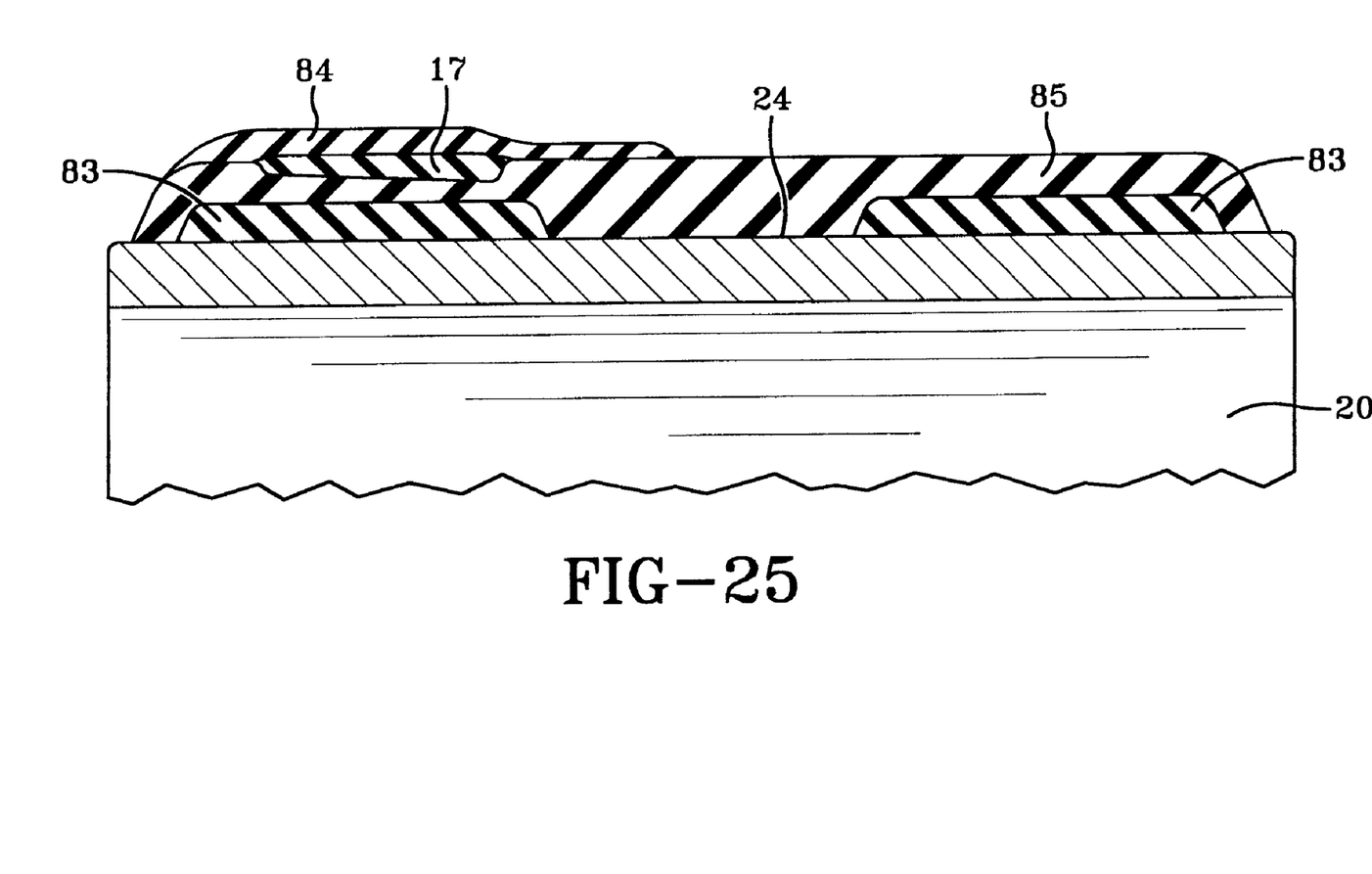
FIG. 25 is a fragmentary sectional view of the roller and tire sidewall taken along the line 25—25 in FIG. 2.

With continuing reference to FIGS. 1–3, 19, 20 and 23 chafers of first melt 83 are covered by the black sidewall of second melt 85 and the white sidewall of the third melt 17 covers part of the black sidewall. The cover of the fourth melt 84 is located over the white sidewall material for grinding off after the tire is vulcanized. The different layers of visco-elastic rubber material deposited on the roller surface 24 of roller 20, as shown in FIG. 25, are then carried by the roller past the edge of the die plate 64 for final shaping. From there the tire sidewall 26 is deposited on take away belt 22. The various flow channels are shaped and sized as discussed above to reduce the elongational flow of the melts and thus reduce the resultant shrinkage of the extrudate 26.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An extrusion apparatus for extruding visco-elastic materials including an extruder head for preliminary shaping of a visco-elastic melt and a die assembly for final shaping of the visco-elastic melt, said extruder head having a first head flow channel for communicating the visco-elastic melt from an associated first pressure means said die assembly including a first splice bar having first and second flow channels for communicating the visco-elastic melt from said extruder head to an associated roller, said die assembly having a roller surface that is generally cylindrical and conforms to a surface of an associated roller, said extrusion apparatus being characterized by:

said first head flow channel branching into first and second flow channels each having similar, gradually changing cross sectional areas throughout their respective lengths including first and second low elongational flow zones of constant cross sectional area having length ratios within the range of 0.10 to 0.50 wherein each said length ratio is the ratio of the length of each said low elongational flow zone to the total length of each said flow channel and varying cross sectional shapes located at the ends of said first and second branch flow channels, said first head flow channel having a zone area ratio within the range of 3 to 20; wherein said zone area ratio is the ratio of the cross sectional area at the entrance to each of said low elongational flow zones to the cross sectional area at the outlet portion of each of said low elongational flow zones and, said first and second flow channels of said first splice bar having a flow channel area ratio within the range of 1.0 and 3.0 wherein said flow channel area ratio is the ratio of the cross sectional area at the entrance end of said flow channels to the cross sectional area at the exit end of said flow channels and low elongational flow zones of constant cross sectional area and a minimum length of one inch (2.54 centimeters) with an L/A ratio of at least 2.0 l/in.

2. An extruder head having a head flow channel for communicating and shaping a visco-elastic melt, said extruder head being characterized by:

said head flow channel comprising a low elongational flow zone of constant cross sectional area with an L/A ratio of at least 2.0 and minimum length of one inch (2.54 centimeters).

3. The extruder head of claim 2 further characterized by said low elongational flow zone being located at an exit end of said head flow channel.

4. The extruder head of claim 2 further characterized by said low elongational flow zone having a varying cross sectional shape.

5. The extruder head of claim 2 further characterized by said head flow channel having a zone area ratio within the range of 3 to 20 wherein said zone area ratio is the ratio of the cross sectional area at the entrance to said head flow channel to the cross sectional area at the exit end of said head flow channel.

6. The extruder head of claim 2 further characterized by said head flow channel having a length ratio within the range of 0.10 to 0.50 wherein said length ratio is the ratio of the length of said low elongational flow zone to the length of said head flow channel.

7. The extruder head of claim 6 further characterized by said length ratio being about 0.25.

8. The extruder head of claim 2 wherein said head flow channel branches into first and second branch flow channels having substantially the same cross sectional areas throughout their respective lengths, further characterized by said first and second branch flow channels each having a low elongational flow zone at least 1.0 inch (2.54 centimeters) long.

* * * * *